(12) United States Patent
Götz et al.

(10) Patent No.: US 7,448,465 B2
(45) Date of Patent: Nov. 11, 2008

(54) MACHINE WITH A STEERING AXLE WITH AXLE TREE BOLSTERS AND AXLE BODIES HAVING INDIVIDUAL COMPONENTS

(75) Inventors: Bernhard Götz, Aschaffenburg (DE); Stefan Hafner, Laufach (DE); Constantin Roßkopf, Rodgau (DE)

(73) Assignee: Linde Material Handling GmbH, Aschaffenburg (DE)

( * ) Notice: Subject to any disclaimer, the term of this patent is extended or adjusted under 35 U.S.C. 154(b) by 369 days.

(21) Appl. No.: 11/271,493

(22) Filed: Nov. 11, 2005

(65) Prior Publication Data

US 2006/0156946 A1    Jul. 20, 2006

(30) Foreign Application Priority Data

Nov. 13, 2004  (DE) ............... 10 2004 054 975

(51) Int. Cl.
    *B60B 33/02* (2006.01)
(52) U.S. Cl. .................. 180/411; 16/31 A
(58) Field of Classification Search ........... 180/11, 180/12, 13, 411; 16/31 A, 31 R, 38, 39
    See application file for complete search history.

(56) References Cited

U.S. PATENT DOCUMENTS

| | | | | |
|---|---|---|---|---|
| 1,271,559 A | * | 7/1918 | Feebusch et al. ........... | 16/21 |
| 2,111,561 A | * | 3/1938 | Herold ...................... | 16/21 |
| 2,654,112 A | * | 10/1953 | Milhizer .................... | 16/35 R |
| 2,700,173 A | * | 1/1955 | Huffman .................... | 16/44 |
| 3,263,266 A | * | 8/1966 | Rabelos et al. ............. | 16/44 |
| 4,166,516 A | * | 9/1979 | Thurmond, Jr. ............ | 182/15 |
| 5,183,133 A | * | 2/1993 | Roy et al. .................. | 180/252 |
| 5,699,873 A | * | 12/1997 | Moriya et al. .............. | 180/402 |
| 6,668,965 B2 | * | 12/2003 | Strong ....................... | 180/411 |

FOREIGN PATENT DOCUMENTS

| DE | 1 065 328 | | 9/1959 |
|---|---|---|---|
| EP | 476237 A1 | * | 3/1992 |
| JP | 02011402 A | * | 1/1990 |

* cited by examiner

Primary Examiner—Kevin Hurley
(74) Attorney, Agent, or Firm—The Webb Law Firm

(57) ABSTRACT

An industrial truck has a steering axle with two axle tree bolster systems located at a lateral distance from each other. Each system has an axle body with an axle shaft (1) and an axle tree bolster (2) located on the lower end of the axle shaft (1). The axle tree bolster (2) and the axle shaft (1) are individual components that are connected with each other. The axle tree bolster (2) is preferably detachably fastened to the axle shaft (1). The rotational position of the axle tree bolster (2) relative to the axle shaft (1) can be adjustable. Means can also be provided for the positive and/or non-positive transmission of a torque from the axle shaft (1) to the axle tree bolsters (2).

9 Claims, 2 Drawing Sheets

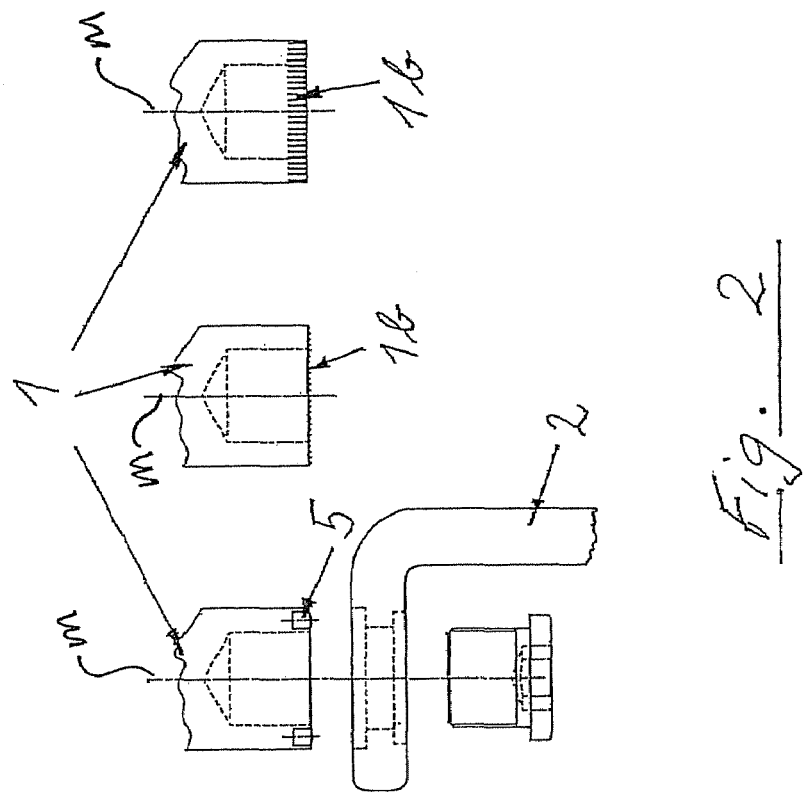
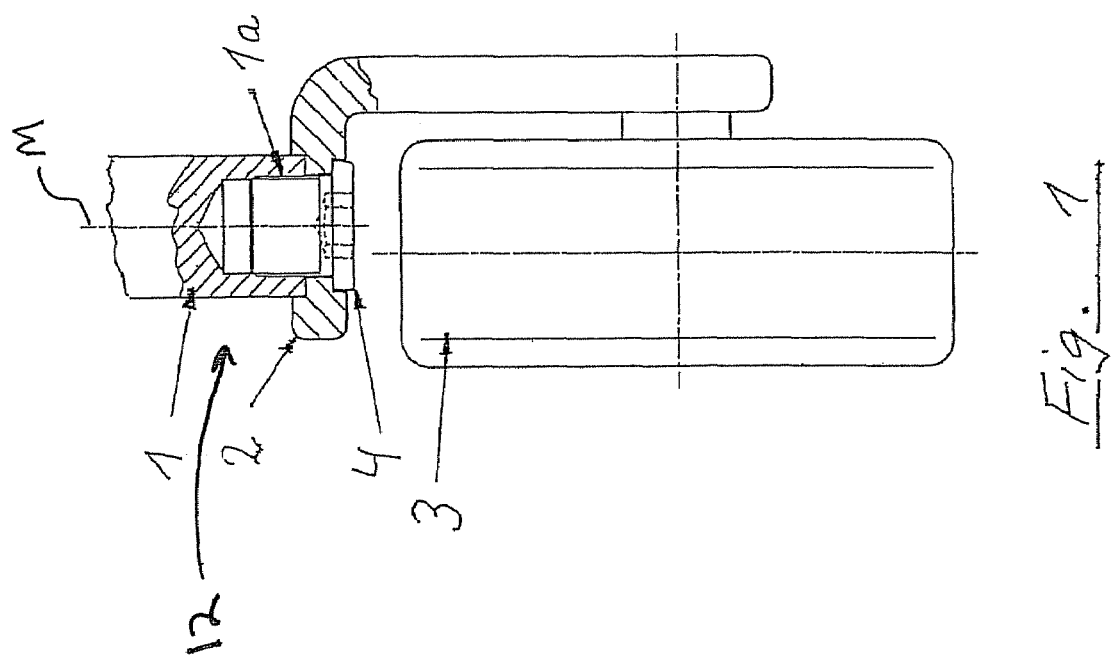
Fig. 1
Fig. 2

MACHINE WITH A STEERING AXLE WITH AXLE TREE BOLSTERS AND AXLE BODIES HAVING INDIVIDUAL COMPONENTS

CROSS-REFERENCE TO RELATED APPLICATION

This application claims priority to German Application No. 10 2004 054 975.3 filed Nov. 13, 2004, which is herein incorporated by reference in its entirety.

BACKGROUND OF THE INVENTION

1. Field of the Invention

This invention relates to a machine, in particular an industrial truck, with a steering axle that has two axle tree bolster systems located laterally at some distance from each other. Each axle tree bolster system has an axle body with an axle shaft in the form of a piston or hollow piston, and an axle tree bolster located on the lower end of the axle shaft. The axle shaft is mounted so that it can rotate in a hydraulic cylinder and can be extended downwardly from the cylinder. At least one wheel is rotationally mounted on the axle tree bolster.

2. Technical Considerations

An industrial truck of the known art is disclosed in published patent specification DE 1 065 328. The two axle bodies, which are located in the hydraulic cylinders of the steering axle of the industrial truck and are connected to each other to equalize the wheel load, have, in addition to the function of serving as mountings for the wheels, the task of performing a piston function and therefore are complex, expensive, and time-consuming to manufacture.

It is an object of this invention to provide an industrial truck of the general type described above but that has a steering axle that is easier to manufacture.

SUMMARY OF THE INVENTION

The invention teaches that the axle tree bolster and the axle shaft can be individual components that are connected to each other.

In one aspect of the invention, the axle bodies of the two axle tree bolsters are not manufactured in one piece but are assembled from individual components, namely from the axle shaft and the axle tree bolster fastened to it.

The components, i.e., the axle shaft and axle tree bolster, can therefore be manufactured independently of each other. The fabrication of the cylindrical friction and sealing surface of the axle shaft is thereby simplified, in particular the grinding and chromium plating. On account of the lower weight of the individual components, the handling of these components during assembly of the steering axle is also simplified.

If the axle tree bolster is detachably fastened to the axle shaft, the number of spare parts required in the event of a repair can be minimized because it is possible to re-use any individual components that are not excessively worn or damaged.

In one advantageous configuration of the invention, the rotational position of the axle tree bolster is adjustable relative to the axle shaft. As a result of this angular adjustment capability with relation to the axis of rotation of the axle shaft, compensation can be provided for component tolerances that would otherwise lead to steering angle errors.

Means are advantageously provided for the positive and/or non-positive transmission of a torque or torsion moment from the axle shaft to the axle tree bolster.

In this case, it is advantageous with regard to a simple construction if the axle shaft has a threaded central boring on its end surface, which is effectively connected with a screw that fastens the axle tree bolster onto the axle shaft. The axle tree bolster is detachably connected to the axle shaft by tightening the screw.

To improve the transmission of torque from the axle shaft to the axle tree bolster, which is required by the wheel that is mounted on the axle tree bolster, the axle shaft can be provided on its end surface facing the axle tree bolster with at least one eccentrically located pin that can be brought into engagement with the axle tree bolster.

Alternatively or additionally, it is also possible for the axle shaft to be provided on its end surface facing the axle tree bolster with gearing or knurling.

Alternatively or additionally, the axle shaft can be provided in the vicinity of its end surface facing the axle tree bolster with gearing or knurling on the cylindrical surface.

BRIEF DESCRIPTION OF THE DRAWINGS

Additional advantages and details of the invention are explained in greater detail below with reference to the exemplary embodiment illustrated in the accompanying schematic figures, in which like reference numbers identify like parts throughout.

FIG. 1 shows an axle body of an axle tree bolster system of the steering axle of an industrial truck of the invention, in the assembled state;

FIG. 2 is an exploded view of the axle body plus means for the transmission of torque between the axle shaft and the axle tree bolster.

DESCRIPTION OF THE PREFERRED EMBODIMENTS

Figure 3:
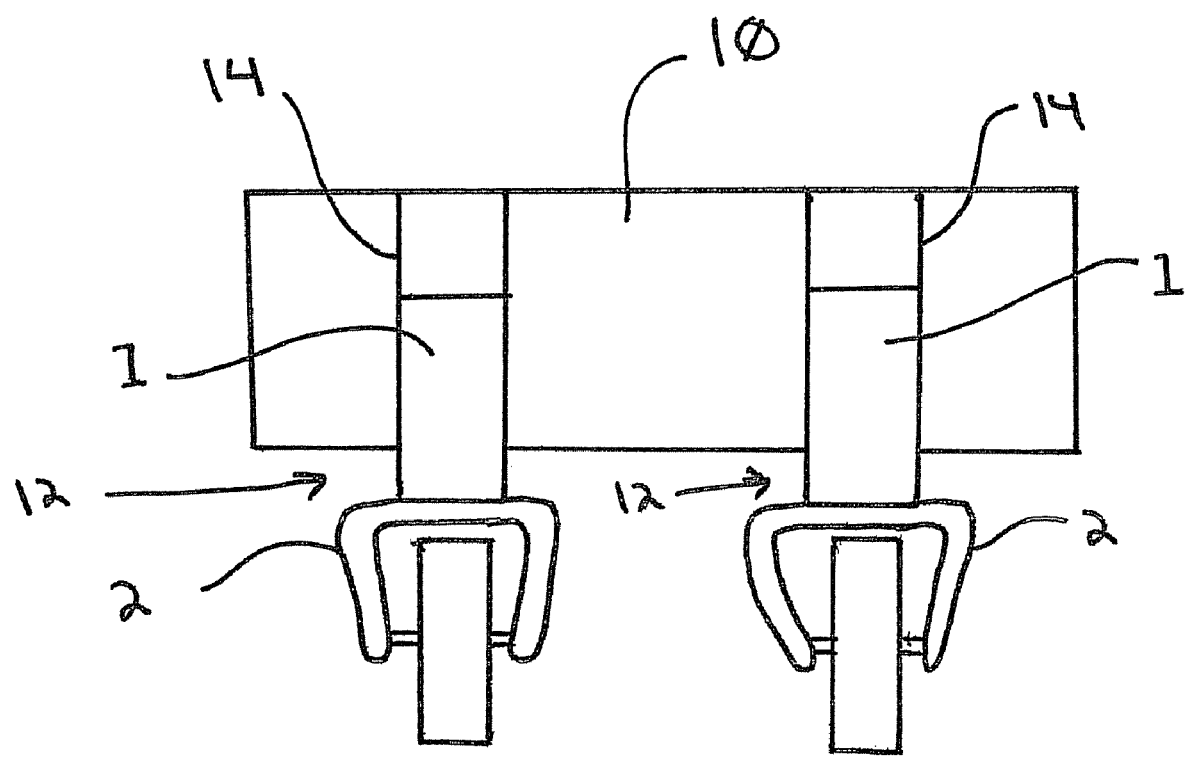
FIG. 3 is a rear view (not to scale) of a steering axle having two axle tree bolster systems of the invention.

The axle tree bolster system illustrated in FIGS. 1 and 3 is part of a steering axle 10 of a machine, for example, an industrial truck of the general type described in DE 1 065 328 and herein incorporated by reference. The steering axle 10, which is typically located on the rear end of the fork-lift truck, has two axle tree bolster systems 2 that are located at some lateral distance from each other. FIG. 1 shows only the axle body 12 of one of the axle tree bolster systems.

The axle tree bolster system of the invention has an axle body 12, which, in the illustrated exemplary embodiment, includes an axle shaft 1 and an axle tree bolster 2 located on the lower end of the axle shaft 1. A wheel 3 is rotationally mounted on the axle tree bolster 2. The axle shaft 1, which can be rotated around its center axis M to produce a steering motion, is located in a hydraulic cylinder 14 in conventional manner and can be extended downwardly from the hydraulic cylinder 14.

If the hydraulic cylinders of the two axle tree bolster systems of the steering axle are hydraulically connected with each other, there is a radial load balancing between the two steered wheels ("hydraulic swing axle").

The invention teaches that the axle shaft 1 and the axle tree bolster 2 are two individual components that are manufactured separately and subsequently joined to form an axle body. By "individual components" is meant that the axle shaft 1 and axle tree bolster 2 are not a single, unitary piece but rather are separate pieces that can be joined together and/or taken apart as desired. By means of a threaded connection, which in this exemplary embodiment has a threaded central boring 1a in the lower end surface of the axle shaft 1 and a screw 4 that interacts with it, the axle tree bolster 2 can be detachably connected with the axle shaft 1.

So that the torque transmission between the axle shaft 1 and the axle tree bolster 2 that produces the steering motion does not have to depend solely on a frictional connection, one or more pins 5 that are located eccentrically with respect to the axis of rotation of the axle shaft 1 can be provided, which create a positive interlock between the axle shaft 1 and the axle tree bolster 2 (see FIG. 2).

Alternatively or additionally, it is also possible for the end surface of the axle shaft 1 and/or the external cylindrical surface in the vicinity of the end surface to have a knurling or gearing 1b (see FIG. 2). The knurling or gearing interacts with knurling or gearing on the axle tree bolster and makes possible not only a positive transmission of torque but also a very precise angular adjustment capability of the rotational position of the axle tree bolster 2 relative to the axle shaft 1. It thereby becomes possible to compensate for manufacturing tolerances on the components that would otherwise cause a steering angle error.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A machine, comprising:
    a steering axle that comprises two axle tree bolster systems located at a spaced lateral distance from each other, each of which has an axle body with an axle shaft and an axle tree bolster located on a lower end of the axle shaft,
    wherein the axle shaft is rotatable in a hydraulic cylinder and is downwardly extensible out of the cylinder,
    wherein at least one wheel is rotationally mounted on each axle tree bolster,
    wherein the axle tree bolster and the axle shaft of the axle tree bolster systems are individual components that are connectable with each other, and
    wherein the axle shaft has a central boring on its end surface that is provided with a thread, which central boring is effectively connectable with a screw that fixes the axle tree bolster onto its associated axle shaft.

2. The machine as claimed in claim 1, wherein the axle tree bolster is detachably fastened to its associated axle shaft.

3. The machine as claimed in claim 1, wherein the rotational position of the axle tree bolster relative to its associated axle shaft is adjustable.

4. The machine as claimed in claim 2, wherein the rotational position of the axle tree bolster relative to its associated axle shaft is adjustable.

5. The machine as claimed in claim 1, including means for the positive and/or non-positive transmission of a torque from the axle shaft to its associated axle tree bolster, wherein the means includes one or more pins that form an interlock between the axle shaft and the axle tree bolster.

6. The machine as claimed in claim 1, wherein the axle shaft is provided on its end surface facing the axle tree bolster with at least one eccentrically located pin that is engageable with the associated axle tree bolster.

7. The machine as claimed in claim 2, wherein the axle shaft is provided on its end surface facing the axle tree bolster with at least one eccentrically located pin that is engageable with the associated axle tree bolster.

8. The machine as claimed in claim 3, wherein the axle shaft is provided on its end surface facing the axle tree bolster with at least one eccentrically located pin that is engageable with the associated axle tree bolster.

9. A machine, comprising:
    a steering axle that comprises two axle tree bolster systems located at a spaced lateral distance from each other, each of which has an axle body with an axle shaft and an axle tree bolster located on a lower end of the axle shaft; and
    means for the positive and/or non-positive transmission of a torque from the axle shaft to its associated axle tree bolster, the means including one or more pins that form an interlock between the axle shaft and the axle tree bolster,
    wherein the axle shaft is rotatable in a hydraulic cylinder and is downwardly extensible out of the cylinder,
    wherein at least one wheel is rotationally mounted on each axle tree bolster,
    wherein the axle tree bolster and the axle shaft of the axle tree bolster systems are individual components that are connectable with each other; and
    wherein the axle shaft is provided on its end surface facing the axle tree bolster with at least one eccentrically located pin that is engageable with the associated axle tree bolster.

* * * * *